(12) United States Patent
Yuuki

(10) Patent No.: US 12,266,808 B2
(45) Date of Patent: Apr. 1, 2025

(54) SECONDARY BATTERY

(71) Applicant: MURATA MANUFACTURING CO., LTD., Kyoto (JP)

(72) Inventor: Takahiro Yuuki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 498 days.

(21) Appl. No.: 17/697,587

(22) Filed: Mar. 17, 2022

(65) Prior Publication Data
US 2022/0209344 A1  Jun. 30, 2022

Related U.S. Application Data

(63) Continuation of application No. PCT/JP2020/033538, filed on Sep. 4, 2020.

(30) Foreign Application Priority Data

Sep. 30, 2019 (JP) .................. 2019-178786

(51) Int. Cl.
*H01M 50/186* (2021.01)
*H01M 50/105* (2021.01)
*H01M 50/178* (2021.01)

(52) U.S. Cl.
CPC ....... *H01M 50/186* (2021.01); *H01M 50/105* (2021.01); *H01M 50/178* (2021.01)

(58) Field of Classification Search
None
See application file for complete search history.

(56) References Cited

U.S. PATENT DOCUMENTS

2007/0292753 A1  12/2007  Zama et al.

FOREIGN PATENT DOCUMENTS

| JP | 2005174844 A | 6/2005 |
|----|--------------|--------|
| JP | 2005216623 A | 8/2005 |
| JP | 2005222901 A | 8/2005 |
| JP | 2007214025 A | 8/2007 |
| JP | 2007335290 A | 12/2007 |
| JP | 2010177088 A | 8/2010 |
| JP | 2012074387 A | 4/2012 |
| JP | 2013073872 A | 4/2013 |
| JP | 2013171618 A | 9/2013 |

OTHER PUBLICATIONS

Machine translation of JP 2013-171618 (Year: 2013).*
International Search Report of corresponding PCT application PCT/JP2020/033538, dated Nov. 24, 2020.

* cited by examiner

*Primary Examiner* — Wyatt P McConnell
(74) *Attorney, Agent, or Firm* — K&L Gates LLP

(57) ABSTRACT

A secondary battery includes an outer package member, a battery device, a wiring member, and a sealing member. The outer package member has flexibility and has an opening. The battery device is accommodated inside the outer package member. The wiring member extends from an inside of the outer package member to an outside of the outer package member via the opening. The wiring member is coupled to the battery device. The sealing member has an insulating property. The sealing member extends along the wiring member from the inside of the outer package member at least to the opening, and is interposed between the battery device and the wiring member. The sealing member is configured to seal the opening.

15 Claims, 9 Drawing Sheets

SECONDARY BATTERY

CROSS REFERENCE TO RELATED APPLICATIONS

The present application is a continuation of PCT patent application no. PCT/JP2020/033538, filed on Sep. 4, 2020, which claims priority to Japanese patent application no. JP2019-178786 filed on Sep. 30, 2019, the entire contents of which are being incorporated herein by reference.

BACKGROUND

The present technology generally relates to a secondary battery.

Various kinds of electronic equipment, including mobile phones, have been widely used. Such widespread use has promoted development of a secondary battery as a power source that is smaller in size and lighter in weight and allows for a higher energy density. A configuration of the secondary battery influences a battery characteristic and has therefore been considered in various ways.

Specifically, in order to achieve various purposes in a secondary battery including an outer package member such as a laminated film, a configuration such as a shape of a tab, a shape of a lead, or a sealing structure is made appropriate.

SUMMARY

The present technology generally relates to a secondary battery.

Although consideration has been given in various ways to solve problems of a secondary battery, the secondary battery has not yet achieved sufficient suppression of an internal short circuit caused by an external load, and there is still room for improvement in terms thereof.

The present technology has been made in view of such an issue and it is an object of the technology to provide a secondary battery that makes it possible to suppress an internal short circuit caused by an external load.

A secondary battery according to an embodiment of the present technology includes an outer package member, a battery device, a wiring member, and a sealing member. The outer package member has flexibility and has an opening. The battery device is accommodated inside the outer package member. The wiring member extends from an inside of the outer package member to an outside of the outer package member via the opening. The wiring member is coupled to the battery device. The sealing member has an insulating property. The sealing member extends along the wiring member from the inside of the outer package member at least to the opening, and is interposed between the battery device and the wiring member. The sealing member is configured to seal the opening.

According to the secondary battery of the embodiment of the technology, the battery device is contained inside the outer package member having flexibility. The wiring member extending from the inside to the outside of the outer package member is coupled to the battery device. The sealing member having an insulating property and sealing the opening of the outer package member extends along the wiring member and is interposed between the battery device and the wiring member. Accordingly, it is possible to suppress an internal short circuit of the secondary battery caused by an external load.

It should be understood that effects of the technology are not necessarily limited to those described above and may include any of a series of effects described below in relation to the present technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is greater than an electrochemical capacity per unit area of the positive electrode.

Although not particularly limited in kind, the electrode reactant is a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
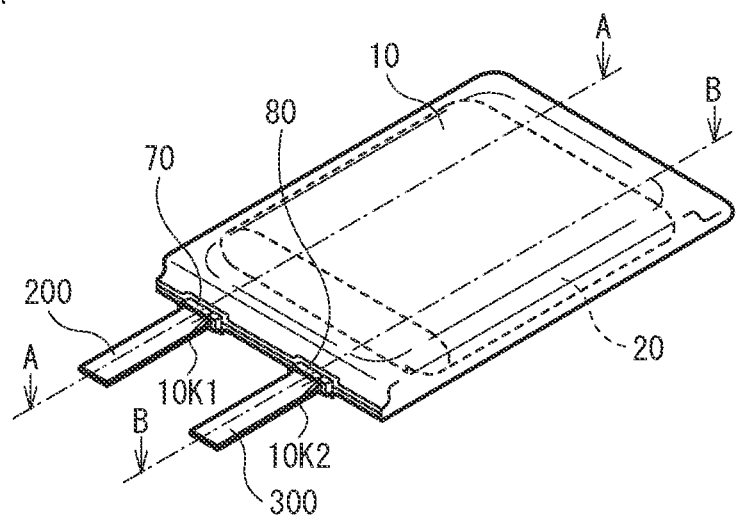
FIG. 1 is a perspective view of a configuration of a secondary battery according to an embodiment of the present technology.
Figure 2:
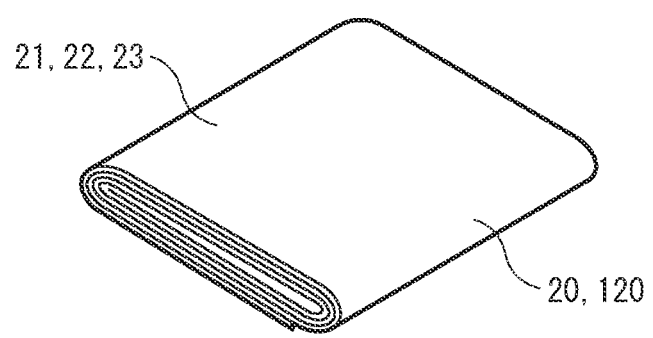
FIG. 2 is a perspective view of a configuration of a battery device illustrated in FIG. 1.
Figure 3:
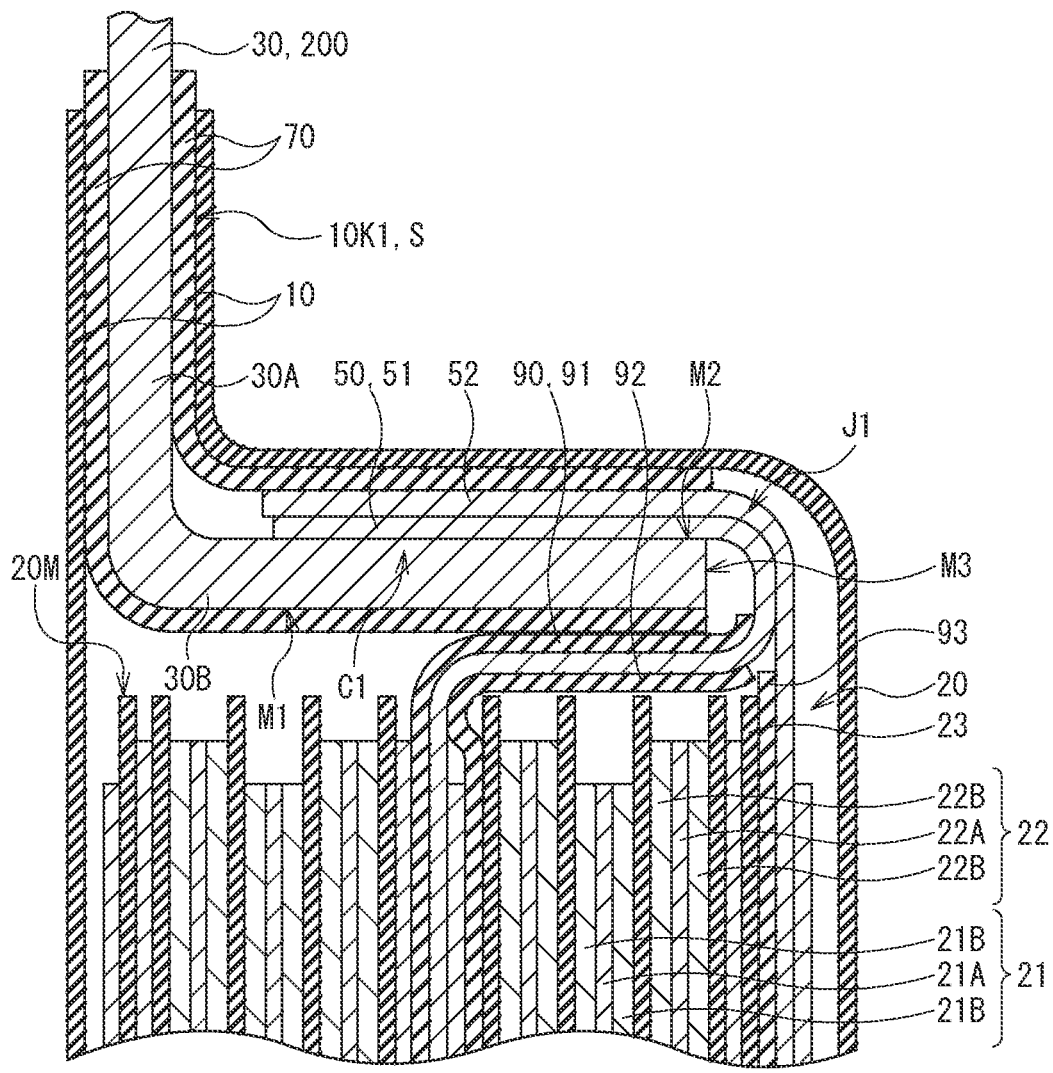
FIG. 3 is a sectional view of the configuration of the secondary battery illustrated in FIG. 1.
Figure 4:
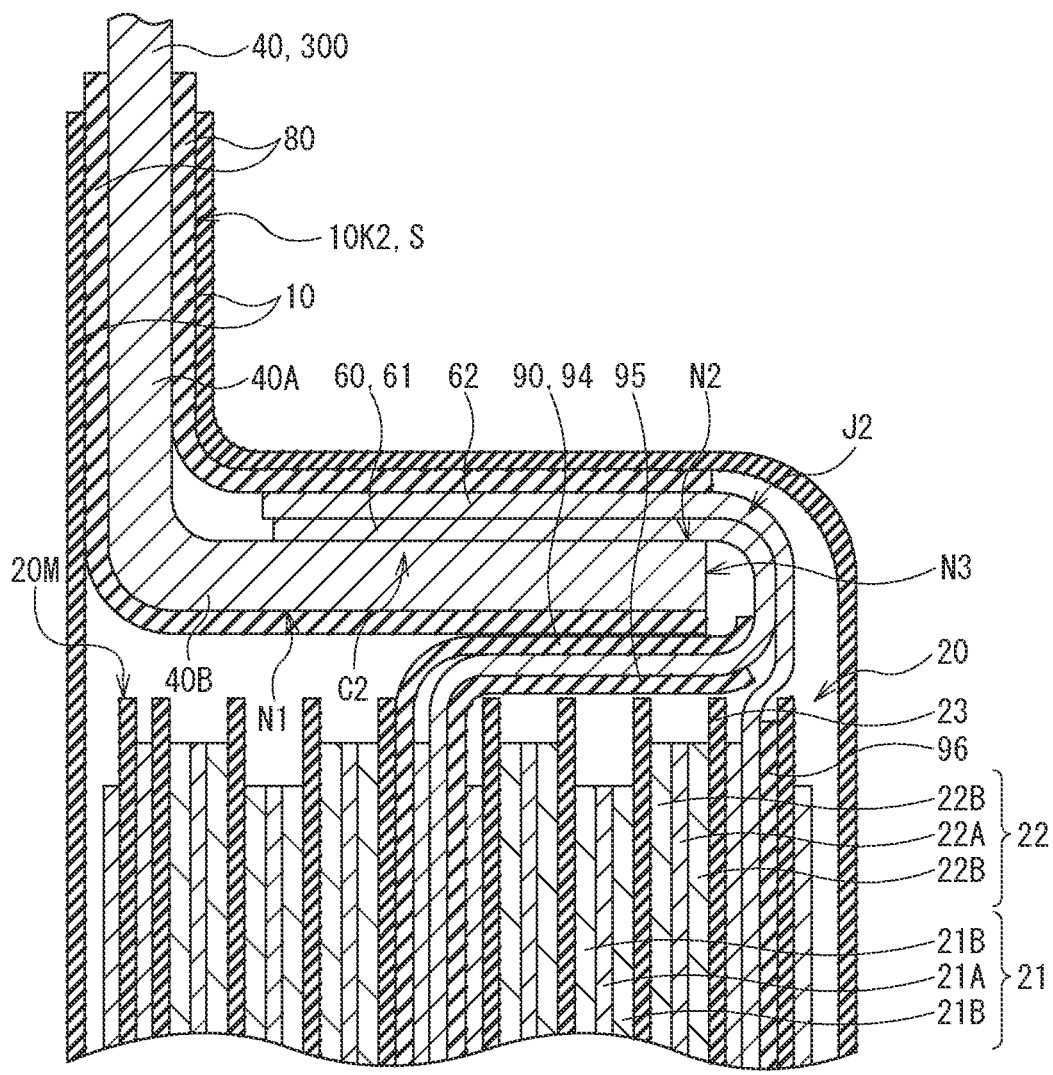
FIG. 4 is another sectional view of the configuration of the secondary battery illustrated in FIG. 1.

FIG. 1 illustrates a perspective configuration of the secondary battery. FIG. 2 illustrates a perspective configuration of a battery device 20 illustrated in FIG. 1. FIGS. 3 and 4 each illustrate a sectional configuration of the secondary battery illustrated in FIG. 1. It should be understood that FIG. 3 illustrates a section taken along a line A-A, and FIG. 4 illustrates a section taken along a line B-B.

In the following description, a vertical direction in FIGS. 3 and 4 is regarded as a height direction of the secondary battery, and a horizontal direction in FIGS. 3 and 4 is regarded as a width direction of the secondary battery. Further, in the height direction of the secondary battery, an up direction in FIGS. 3 and 4 is regarded as an upper side of the secondary battery, and a down direction in FIGS. 3 and 4 is regarded as a lower side of the secondary battery.

As illustrated in FIGS. 1 to 4, the secondary battery includes an outer package film 10, the battery device 20, a positive electrode wiring line 200, a negative electrode wiring line 300, a positive electrode sealant 70, a negative electrode sealant 80, and an insulating tape 90. The positive electrode wiring line 200 is a wiring member including a positive electrode lead 30 and positive electrode tabs 50. The negative electrode wiring line 300 is another wiring member including a negative electrode lead 40 and negative electrode tabs 60.

In the secondary battery, the battery device 20 is contained inside the outer package film 10. The positive electrode wiring line 200 and the negative electrode wiring line 300 are coupled to the battery device 20. The positive electrode wiring line 200 and the negative electrode wiring line 300 are led out in a common direction from an inside to an outside of the outer package film 10.

In other words, the secondary battery described here is a secondary battery of a laminated-film type in which the outer package film 10 is used as an outer package member to contain the battery device 20. Here, the secondary battery has a flat three-dimensional shape.

The outer package film 10 is an outer package member having flexibility or softness. More specifically, as illustrated in FIGS. 1, 3, and 4, the outer package film 10 is a member having a hollow pouch shape. The outer package film 10 includes one or more of materials including, without limitation, a polymer material and a metal material.

Specifically, the outer package film 10 is a three-layer laminated film including a fusion-bonding layer, a metal layer, and a surface protective layer that are stacked in this order from an inner side. The fusion-bonding layer is a polymer film including a polymer material such as polypropylene, and is fusion-bondable by a method such as a thermal fusion bonding method. The metal layer is a metal foil including a metal material such as aluminum. The surface protective layer is a polymer film including a polymer material such as nylon. The number of layers of the outer package film 10 as a laminated film is not particularly limited, and may be two, or four or more. It goes without saying that the outer package film 10 is not limited to a multilayer film, and may be a single-layer film.

The outer package film 10 has an opening 10K1 through which the positive electrode wiring line 200 is to be led out and an opening 10K2 through which the negative electrode wiring line 300 is to be led out. The opening 10K1 is sealed by means of the positive electrode sealant 70 in a state where the positive electrode wiring line 200 is led out to the outside of the outer package film 10 via the opening 10K1, as will be described later. In addition, the opening 10K2 is sealed by means of the negative electrode sealant 80 in a state where the negative electrode wiring line 300 is led out to the outside of the outer package film 10 via the opening 10K2, as will be described later.

It should be understood that the outer package film 10 is formed by sealing an opening 10K, which will be described later with reference to FIGS. 5 and 6, in a state where the positive electrode wiring line 200 and the negative electrode wiring line 300 are each led out via the opening 10K. Specifically, in a manufacturing process of the secondary battery, portions of the outer package film 10 opposed to each other at the opening 10K are joined to each other with the positive electrode wiring line 200, the negative electrode wiring line 300, the positive electrode sealant 70, and the negative electrode sealant 80 interposed therebetween, to thereby seal the outer package film 10 except for the openings 10K1 and 10K2. As a result, the outer package film 10 has a seal part S at which the opening 10K is sealed.

The battery device 20 is a device causing charging and discharging reactions to proceed. As illustrated in FIGS. 2 to 4, the battery device 20 is contained inside the outer package film 10. The battery device 20 includes a positive electrode 21, a negative electrode 22, a separator 23, and an electrolytic solution which is a liquid electrolyte. It should be understood that FIGS. 2 to 4 each omit the illustration of the electrolytic solution.

The positive electrode 21 and the negative electrode 22 are wound with the separator 23 interposed therebetween. More specifically, the positive electrode 21 and the negative electrode 22 are stacked on each other with the separator 23 interposed therebetween, and are wound in the state of the stack with the separator 23 interposed between the positive electrode 21 and the negative electrode 22. Thus, the battery device 20 is a wound electrode body including the positive electrode 21 and the negative electrode 22 that are wound with the separator 23 interposed therebetween. The respective numbers of winds of the positive electrode 21, the negative electrode 22, and the separator 23 are not particularly limited, and may be freely chosen.

It should be understood that the positive electrode 21 has a height smaller than that of the separator 23. A reason for this is that this prevents a short circuit caused by the positive electrode 21. The negative electrode 22 has a height smaller than that of the separator 23 and larger than that of the positive electrode 21. A reason for this is that this prevents a short circuit caused by the negative electrode 22 and also prevents a short circuit between the positive electrode 21 and the negative electrode 22 caused by precipitation of lithium upon charging and discharging.

The positive electrode 21 includes a positive electrode current collector 21A and a positive electrode active material layer 21B. The positive electrode current collector 21A is a metal foil including a metal material such as aluminum. The positive electrode active material layer 21B is provided on each of opposite sides of the positive electrode current collector 21A. It should be understood that the positive electrode active material layer 21B may be provided only on one of the opposite sides of the positive electrode current collector 21A. The positive electrode active material layer 21B includes a positive electrode active material into which lithium is insertable and from which lithium is extractable. The positive electrode active material includes one or more of lithium-containing compounds including, without limitation, a lithium-containing transition metal compound. Examples of the lithium-containing transition metal compound include an oxide, a phosphoric acid compound, a silicic acid compound, and a boric acid compound each including lithium and one or more transition metal elements as constituent elements. It should be understood that the positive electrode active material layer 21B may further include, for example, a positive electrode binder and a positive electrode conductor.

The negative electrode 22 includes a negative electrode current collector 22A and a negative electrode active material layer 22B. The negative electrode current collector 22A is a metal foil including a metal material such as copper. The negative electrode active material layer 22B is provided on each of opposite sides of the negative electrode current collector 22A. It should be understood that the negative electrode active material layer 22B may be provided only on one of the opposite sides of the negative electrode current collector 22A. The negative electrode active material layer 22B includes a negative electrode active material into which lithium is insertable and from which lithium is extractable. The negative electrode active material includes one or more of materials including, without limitation, a carbon material and a metal-based material. Examples of the carbon material include graphite. The metal-based material is a material that includes, as a constituent element or constituent elements, one or more elements among metal elements and metalloid elements that are each able to form an alloy with lithium. Specifically, the metal-based material includes one or more of elements including, without limitation, silicon and tin. The metal-based material may be a simple substance, an alloy, a compound, or a mixture of two or more thereof. It should be understood that the negative electrode active material layer 22B may further include, for example, a negative electrode binder and a negative electrode conductor.

The separator 23 is an insulating porous film interposed between the positive electrode 21 and the negative electrode 22. The separator 23 allows lithium to pass therethrough while preventing a short circuit between the positive electrode 21 and the negative electrode 22. This separator 23 includes one or more of polymer materials including, without limitation, polyethylene.

The positive electrode 21, the negative electrode 22, and the separator 23 are each impregnated with the electrolytic solution. The electrolytic solution includes a solvent and an electrolyte salt. The solvent includes one or more of non-aqueous solvents (organic solvents) including, without limitation, a carbonic-acid-ester-based compound, a carboxylic-acid-ester-based compound, and a lactone-based compound. The electrolyte salt includes one or more of light metal salts including, without limitation, a lithium salt.

In the battery device 20 which is the wound electrode body, the positive electrode active material layer 21B is provided on a portion of the positive electrode current collector 21A, and the negative electrode active material layer 22B is provided on a portion of the negative electrode current collector 22A.

Specifically, at each of ends of the positive electrode 21 on an inner side and an outer side of winding, the positive electrode active material layer 21B is not provided on the positive electrode current collector 21A, and the positive electrode current collector 21A is thus exposed. Accordingly, the positive electrode 21 has a foil winding structure in which only the positive electrode current collector 21A is wound at each of the ends on the inner side and the outer side of the winding.

Similarly, at each of ends of the negative electrode 22 on the inner side and the outer side of the winding, the negative electrode active material layer 22B is not provided on the negative electrode current collector 22A, and the negative electrode current collector 22A is thus exposed. Accordingly, the negative electrode 22 has a foil winding structure in which only the negative electrode current collector 22A is wound at each of the ends on the inner side and the outer side of the winding.

It should be understood that FIG. 2 also illustrates a wound body 120 to be used to fabricate the battery device 20 in the manufacturing process of the secondary battery to be described later. The wound body 120 has a configuration similar to that of the battery device 20 which is the wound electrode body, except that the positive electrode 21, the negative electrode 22, and the separator 23 are each yet to be impregnated with the electrolytic solution.

The positive electrode wiring line 200 extends from the inside of the outer package film 10 to the outside of the outer package film 10 via the opening 10K1, and is coupled to the positive electrode 21 of the battery device 20. The negative electrode wiring line 300 extends from the inside of the outer package film 10 to the outside of the outer package film 10 via the opening 10K2, and is coupled to the negative electrode 22 of the battery device 20.

As illustrated in FIGS. 1 and 3, the positive electrode lead 30 is a second wiring member that extends from the inside of the outer package film 10 to the outside of the outer package film 10 via the opening 10K1.

One end of the positive electrode lead 30 is coupled to another end of each of the positive electrode tabs 50 inside the outer package film 10. Here, the one end of the positive electrode lead 30 is coupled to a joint part J1, which will be described later, to thereby form a coupling part C1. The coupling part C1 is a part at which the positive electrode lead 30 and the joint part J1 are coupled to each other by a method such as a welding method. Another end of the positive electrode lead 30 is led out to the outside of the outer package film 10.

Here, inside the outer package film 10, the positive electrode lead 30 is bent in a direction intersecting with a direction in which the positive electrode lead 30 is led out from the outer package film 10, i.e., is bent in a horizontal direction in FIG. 3 intersecting with a vertical direction in FIG. 3. The positive electrode lead 30 thus includes lead parts 30A and 30B.

The lead part 30A is an extending part that extends from the inside of the outer package film 10 to the outside of the outer package film 10 via the opening 10K1. The lead part 30B is an opposed part that extends in a direction intersecting with a direction in which the lead part 30A extends, while being opposed to the battery device 20 inside the outer package film 10. The lead part 30B is coupled to the lead part 30A.

The lead part 30B includes a lower surface M1, an upper surface M2, and a side surface M3. The lower surface M1 is a surface with which the lead part 30B is opposed to the battery device 20, i.e., is an opposed surface. The upper surface M2 is a surface provided on an opposite side to the lower surface M1, i.e., is an opposite surface. The side surface M3 is a surface positioned between the lower surface M1 and the upper surface M2 and coupled to both the lower surface M1 and the upper surface M2.

It should be understood that, as long as the lead part 30B is opposed to the battery device 20, the lower surface M1 of the lead part 30B may be parallel to an upper surface 20M of the battery device 20, or may be inclined with respect to the upper surface 20M. The angle at which the lower surface M1 is inclined with respect to the upper surface 20M is not particularly limited as long as the angle secures the opposed relationship between the lead part 30B and the battery device 20.

The positive electrode lead 30 includes a material similar to a material included in the positive electrode current collector 21A. It should be understood that the material included in the positive electrode lead 30 may be the same as or different from the material included in the positive electrode current collector 21A.

The negative electrode lead 40 has a configuration similar to the configuration of the positive electrode lead 30 described above. That is, as illustrated in FIGS. 1 and 4, the negative electrode lead 40 is another second wiring member that extends from the inside of the outer package film 10 to the outside of the outer package film 10 via the opening 10K2.

One end of the negative electrode lead 40 is coupled to another end of each of the negative electrode tabs 60 inside the outer package film 10. Here, the one end of the negative electrode lead 40 is coupled to a joint part J2, which will be described later, to thereby form a coupling part C2. The coupling part C2 is a part at which the negative electrode lead 40 and the joint part J2 are coupled to each other by a method such as a welding method. Another end of the negative electrode lead 40 is led out to the outside of the outer package film 10.

Here, inside the outer package film 10, the negative electrode lead 40 is bent in a direction intersecting with a direction in which the negative electrode lead 40 is led out from the outer package film 10, i.e., is bent in a horizontal direction in FIG. 4 intersecting with a vertical direction in FIG. 4. The negative electrode lead 40 thus includes lead parts 40A and 40B.

The lead part 40A is another extending part that extends from the inside of the outer package film 10 to the outside of the outer package film 10 via the opening 10K2. The lead part 40B is another opposed part that extends in a direction intersecting with a direction in which the lead part 40A extends, while being opposed to the battery device 20 inside the outer package film 10. The lead part 40B is coupled to the lead part 40A.

The lead part 40B includes a lower surface N1, an upper surface N2, and a side surface N3. The lower surface N1 is a surface with which the lead part 40B is opposed to the battery device 20, i.e., is another opposed surface. The upper surface N2 is a surface provided on an opposite side to the lower surface N1, i.e., is another opposite surface. The side surface N3 is a surface positioned between the lower surface N1 and the upper surface N2 and coupled to both the lower surface N1 and the upper surface N2.

It should be understood that, as long as the lead part 40B is opposed to the battery device 20, the lower surface N1 of the lead part 40B may be parallel to the upper surface 20M of the battery device 20, or may be inclined with respect to the upper surface 20M. The angle at which the lower surface N1 is inclined with respect to the upper surface 20M is not particularly limited as long as the angle secures the opposed relationship between the lead part 40B and the battery device 20.

The negative electrode lead 40 includes a material similar to a material included in the negative electrode current collector 22A. It should be understood that the material included in the negative electrode lead 40 may be the same as or different from the material included in the negative electrode current collector 22A.

As illustrated in FIG. 3, the positive electrode tabs 50 are first wiring members disposed inside the outer package film 10. A reason why the positive electrode tabs 50 are plural in number is that this allows for a decrease in electric resistance (electric coupling resistance) of the battery device 20 (the positive electrode 21).

The secondary battery described here includes two positive electrode tabs 50, i.e., positive electrode tabs 51 and 52, which are the minimum number of positive electrode tabs 50.

A reason for this is that the electric resistance of the battery device 20 decreases as described above, as compared to a case where the number of the positive electrode tabs 50 is one. Another reason is that, in a case where the number of the positive electrode leads 30 is set to two or more, the positive electrode leads 30 have to be led out from the outer package film 10 to the outside separately from each other, or have to be led out from the outer package film 10 to the outside while being stacked on each other, which results in an increase in the number of the seal parts S or complication of a sealing structure of the seal part S. This causes reliability of the seal part S to be lowered easily.

The number of the positive electrode tabs 50 is not particularly limited and is therefore freely chosen. However, in order to decrease the electric resistance of the battery device 20 and to reduce volume loss related to an inner space of the outer package film 10, the number of the positive electrode tabs 50 is preferably three or less, and more preferably two or less. In addition, in order to reduce the above-described volume loss, the thickness of the positive electrode tabs 50 is preferably smaller than the thickness of the positive electrode lead 30.

One end of each of the positive electrode tabs 51 and 52 is coupled to the battery device 20, more specifically, to the positive electrode 21 (the positive electrode current collector 21A). Another end of the positive electrode tab 51 and another end of the positive electrode tab 52 are in contact with each other. Here, the positive electrode tabs 51 and 52 are joined to each other, to thereby form the joint part J1. The joint part J1 is a part at which the other end of the positive electrode tab 51 and the other end of the positive electrode tab 52 are joined to each other by a method such as a welding method.

The joint part J1 is coupled to the one end of the positive electrode lead 30 to thereby form the coupling part C1, as described above. Here, the positive electrode lead 30 includes the lead part 30B inside the outer package film 10 as described above, and accordingly, the joint part J1 is coupled to the lead part 30B. In this case, the joint part J1 is coupled to the lead part 30B at the upper surface M2.

In order to form the coupling part C1, a portion of the positive electrode tabs 51 and 52, i.e., the positive electrode tab 51, is bent to lie along a surface of the lead part 30B. Specifically, the positive electrode tab 51 is bent to lie along the lower surface M1, the side surface M3, and the upper surface M2 in this order. The joint part J1 is thus coupled to the lead part 30B at the upper surface M2, as described above.

Each of the positive electrode tabs 51 and 52 includes a material similar to the material included in the positive electrode current collector 21A. It should be understood that the material included in each of the positive electrode tabs 51 and 52 may be the same as or different from the material included in the positive electrode current collector 21A.

A position of coupling between each of the positive electrode tabs 51 and 52 and the positive electrode 21 is not particularly limited. Here, because the positive electrode 21 is wound in the battery device 20 which is the wound electrode body, the positive electrode tab 51 is coupled to the end of the positive electrode 21 on the inner side of the winding, and the positive electrode tab 52 is coupled to the end of the positive electrode 21 on the outer side of the winding. In other words, because the positive electrode 21 has the foil winding structure, as described above, each of the positive electrode tabs 51 and 52 is coupled to the positive electrode current collector 21A. A reason for this is that this allows an electric coupling characteristic obtained with use of the positive electrode current collector 21A to be uniform, making it easier for the charging and discharging reactions to proceed uniformly in the positive electrode 21.

In this case, the positive electrode tabs 51 and 52 are preferably coupled to the positive electrode current collector 21A at respective positions symmetrical with respect to the center of the positive electrode current collector 21A in the extending direction of the positive electrode current collector 21A. In other words, a distance from the center position of the positive electrode current collector 21A in the extending direction thereof to the position of coupling between the positive electrode tab 51 and the positive electrode current collector 21A and a distance from the above-described center position of the positive electrode current collector 21A to the position of coupling between the positive electrode tab 52 and the positive electrode current collector 21A are preferably substantially equal. A reason for this is that this allows the electric coupling characteristic obtained with use of the coupling to the positive electrode current collector 21A to be more uniform.

Although the positive electrode tab 52 is coupled to the positive electrode current collector 21A on the right side in FIG. 3 here, the position at which the positive electrode tab 52 is coupled to the positive electrode current collector 21A is not particularly limited. For example, the positive electrode tab 52 may be coupled to the positive electrode current collector 21A on the left side in FIG. 3. However, in order to allow the length of the positive electrode tab 52 to be short, the positive electrode tab 52 is preferably coupled to the positive electrode current collector 21A on the right side in FIG. 3, i.e., on a side closer to a side to which the positive electrode tab 51 is bent.

The negative electrode tabs 60 have a configuration similar to the configuration of the positive electrode tabs 50 described above. That is, as illustrated in FIG. 4, the negative electrode tabs 60 are other first wiring members disposed inside the outer package film 10. A reason why the negative electrode tabs 60 are plural in number is that this allows for a decrease in electric resistance (electric coupling resistance) of the battery device 20 (the negative electrode 22).

The secondary battery described here includes two negative electrode tabs 60, i.e., negative electrode tabs 61 and 62, which are the minimum number of negative electrode tabs 60. A reason for this is that, in a case where the number of the negative electrode lead 40 is set to two or more, reliability of the seal part S is lowered easily for a reason similar to the reason described above in relation to the two positive electrode tabs 50, i.e., the positive electrode tabs 51 and 52. The number of the negative electrode tabs 60 is not particularly limited and is therefore freely chosen. However, the number of the negative electrode tabs 60 is preferably three or less, and more preferably two or less, for a reason similar to that described above in relation to the number of the positive electrode tabs 50.

One end of each of the negative electrode tabs 61 and 62 is coupled to the battery device 20, more specifically, to the negative electrode 22 (the negative electrode current collector 22A). Another end of the negative electrode tab 61 and another end of the negative electrode tab 62 are in contact with each other. Here, the negative electrode tabs 61 and 62 are joined to each other, to thereby form the joint part J2. The joint part J2 is a part at which the other end of the negative electrode tab 61 and the other end of the negative electrode tab 62 are joined to each other by a method such as a welding method.

The joint part J2 is coupled to the one end of the negative electrode lead 40 to thereby form the coupling part C2, as described above. Here, the negative electrode lead 40 includes the lead part 40B inside the outer package film 10, as described above, and accordingly, the joint part J2 is coupled to the lead part 40B. In this case, the joint part J2 is coupled to the lead part 40B at the upper surface N2.

In order to form the coupling part C2, a portion of the negative electrode tabs 61 and 62, i.e., the negative electrode tab 61, is bent to lie along a surface of the lead part 40B. Specifically, the negative electrode tab 61 is bent to lie along the lower surface N1, the side surface N3, and the upper surface N2 in this order. The joint part J2 is thus coupled to the lead part 40B at the upper surface N2, as described above.

Each of the negative electrode tabs 61 and 62 includes a material similar to the material included in the negative electrode current collector 22A. It should be understood that the material included in each of the negative electrode tabs 61 and 62 may be the same as or different from the material included in the negative electrode current collector 22A.

A position of coupling between each of the negative electrode tabs 61 and 62 and the negative electrode 22 is not particularly limited. Here, because the negative electrode 22 is wound in the battery device 20 which is the wound electrode body, the negative electrode tab 61 is coupled to the end of the negative electrode 22 on the inner side of the winding, and the negative electrode tab 62 is coupled to the end of the negative electrode 22 on the outer side of the winding. In other words, because the negative electrode 22 has the foil winding structure, as described above, each of the negative electrode tabs 61 and 62 is coupled to the negative electrode current collector 22A. A reason for this is that this allows an electric coupling characteristic obtained with use of the negative electrode current collector 22A to be uniform, making it easier for the charging and discharging reactions to proceed uniformly in the negative electrode 22.

In this case, the negative electrode tabs 61 and 62 are preferably coupled to the negative electrode current collector 22A at respective positions symmetrical with respect to the center of the negative electrode current collector 22A in the extending direction of the negative electrode current collector 22A, for a reason similar to the reason described above in relation to the position of coupling between each of the negative electrode tabs 61 and 62 and the negative electrode 22.

Although the negative electrode tab 62 is coupled to the negative electrode current collector 22A on the right side in FIG. 4 here, the position at which the negative electrode tab 62 is coupled to the negative electrode current collector 22A is not particularly limited. For example, the negative electrode tab 62 may be coupled to the negative electrode current collector 22A on the left side in FIG. 4, as with the case described above in relation to the positive electrode tab 52. However, in order to allow the length of the negative electrode tab 62 to be short, the negative electrode tab 62 is preferably coupled to the negative electrode current collector 22A on the right side in FIG. 4, i.e., on a side closer to a side to which the negative electrode tab 61 is bent.

As illustrated in FIG. 3, the positive electrode sealant 70 is a sealing member having an insulating property that seals the opening 10K1 to thereby prevent entry of outside air into the outer package film 10. Here, the positive electrode sealant 70 extends along the positive electrode lead 30 from the inside of the outer package film 10 to the outside of the outer package film 10 via the opening 10K1. That is, the positive electrode sealant 70 is introduced to the inside of the outer package film 10 except for the seal part S. More specifically, the positive electrode sealant 70 is introduced to the vicinity of the battery device 20.

One end of the positive electrode sealant 70 is interposed between the battery device 20 and the coupling part C1 inside the outer package film 10. The coupling part C1 is thus insulated from the battery device 20 by means of the positive electrode sealant 70. Another end of the positive electrode sealant 70 is led out to the outside of the outer package film 10 to thereby seal the opening 10K1 as described above.

In particular, the one end of the positive electrode sealant 70 is preferably not only interposed between the battery device 20 and the coupling part C1 but also interposed between the outer package film 10 and the coupling part C1. A reason for this is that this allows the coupling part C1 to be insulated from its surroundings by means of the positive electrode sealant 70.

Here, the positive electrode sealant 70 covers the periphery of the positive electrode lead 30, and therefore has a so-called tube shape. Therefore, the positive electrode sealant 70 is interposed between the battery device 20 and the coupling part C1 and also interposed between the outer package film 10 and the coupling part C1. The joint part J1 is disposed to lie inside the positive electrode sealant 70 having the tube shape to form the coupling part C1.

The positive electrode sealant 70 includes one or more of insulating materials including, without limitation, a polymer material. Examples of the polymer material include polyolefin having adherence to the positive electrode lead 30. Such a polyolefin is not particularly limited in kind, and examples thereof include polyethylene, polypropylene, modified polyethylene, and modified polypropylene.

In particular, in a case where the outer package film 10 includes the fusion-bonding layer which is thermal-fusion-bondable as described above, the positive electrode sealant 70 preferably includes a polymer material that is thermal-fusion-bondable as with the fusion-bonding layer, and the outer package film 10 and the positive electrode sealant 70 are therefore preferably thermal-fusion-bonded to each other at the opening 10K1. A reason for this is that this makes it easier to seal the opening 10K1 by utilizing the thermal fusion bonding between the outer package film 10 and the positive electrode sealant 70 even if the positive electrode lead 30 is present at the opening 10K1.

In this case, the positive electrode sealant 70, which is interposed between the outer package film 10 and the coupling part C1, and the coupling part C1 are preferably thermal-fusion-bonded to each other as well. A reason for this is that this allows the positive electrode sealant 70 to be fixed firmly to the outer package film 10, and therefore prevents positional deviation of the positive electrode sealant 70 caused by an external load such as vibration or impact.

The negative electrode sealant 80 has a configuration similar to the configuration of the positive electrode sealant 70 described above. That is, as illustrated in FIG. 4, the negative electrode sealant 80 is another sealing member having an insulating property that seals the opening 10K2 to thereby prevent entry of outside air into the outer package film 10. Here, the negative electrode sealant 80 extends along the negative electrode lead 40 from the inside of the outer package film 10 to the outside of the outer package film 10 via the opening 10K2. That is, the negative electrode sealant 80 is introduced to the inside of the outer package film 10 except for the seal part S. More specifically, the negative electrode sealant 80 is introduced to the vicinity of the battery device 20.

One end of the negative electrode sealant 80 is interposed between the battery device 20 and the coupling part C2 inside the outer package film 10. The coupling part C2 is thus insulated from the battery device 20 by means of the negative electrode sealant 80. Another end of the negative electrode sealant 80 is led out to the outside of the outer package film 10 to thereby seal the opening 10K2 as described above.

In particular, the one end of the negative electrode sealant 80 is preferably not only interposed between the battery device 20 and the coupling part C2 but also interposed between the outer package film 10 and the coupling part C2. A reason for this is that this allows the coupling part C2 to be insulated from its surroundings by means of the negative electrode sealant 80.

Here, the negative electrode sealant 80 covers the periphery of the negative electrode lead 40, and therefore has a so-called tube shape. Therefore, the negative electrode sealant 80 is interposed between the battery device 20 and the coupling part C2 and also interposed between the outer package film 10 and the coupling part C2. The joint part J2 is disposed to lie inside the negative electrode sealant 80 having the tube shape to form the coupling part C2.

The negative electrode sealant 80 includes one or more of insulating materials including, without limitation, a polymer material. Examples of the polymer material include polyolefin having adherence to the negative electrode lead 40. Details of the kind of polyolefin are as described above.

In particular, in a case where the outer package film 10 includes the fusion-bonding layer which is thermal-fusion-bondable as described above, the negative electrode sealant 80 preferably includes a polymer material that is thermal-fusion-bondable as with the fusion-bonding layer, and the outer package film 10 and the negative electrode sealant 80 are therefore preferably thermal-fusion-bonded to each other at the opening 10K2. A reason for this is that this makes it easier to seal the opening 10K2 by utilizing the thermal fusion bonding between the outer package film 10 and the negative electrode sealant 80 even if the negative electrode lead 40 is present at the opening 10K2.

In this case, the negative electrode sealant 80, which is interposed between the outer package film 10 and the coupling part C2, and the coupling part C2 are preferably thermal-fusion-bonded to each other as well. A reason for this is that this allows the negative electrode sealant 80 to be fixed firmly to the outer package film 10, and therefore prevents positional deviation of the negative electrode sealant 80 caused by an external load.

The insulating tape 90 is disposed inside the outer package film 10. The insulating tape 90 is interposed between electrically conductive components that are adjacent to each other, and thereby insulates such electrically conductive components from each other. Here, the secondary battery includes six insulating tapes 90, i.e., insulating tapes 91 to 96.

As illustrated in FIG. 3, the insulating tapes 91 to 93 insulate the positive electrode tabs 51 and 52 from their surroundings. Specifically, the insulating tape 91 is interposed between the positive electrode tab 51 and the negative electrode current collector 22A at an end of the battery device 20 on the inner side of the winding, and extends to lie along the positive electrode tab 51. The insulating tape 92 is interposed between the positive electrode current collector 21A and the separator 23 at the end of the battery device 20 on the inner side of the winding, and extends to lie along the positive electrode tab 51. The insulating tape 93 is interposed between the positive electrode tab 52 and the separator 23 at an end of the battery device 20 on the outer side of the winding.

As illustrated in FIG. 4, the insulating tapes 94 to 96 insulate the negative electrode tabs 61 and 62 from their surroundings. Specifically, the insulating tape 94 is interposed between the negative electrode current collector 22A and the separator 23 at the end of the battery device 20 on the inner side of the winding, and extends to lie along the negative electrode tab 61. The insulating tape 95 is interposed between the negative electrode tab 61 and the positive electrode current collector 21A at the end of the battery device 20 on the inner side of the winding, and extends to lie along the negative electrode tab 62. The insulating tape 96 is interposed between the positive electrode current collector 21A and the separator 23 at the end of the battery device 20 on the outer side of the winding.

Upon charging of the secondary battery, in the battery device 20, lithium is extracted from the positive electrode 21, and the extracted lithium is inserted into the negative electrode 22 via the electrolytic solution. Upon discharging of the secondary battery, in the battery device 20, lithium is extracted from the negative electrode 22, and the extracted lithium is inserted into the positive electrode 21 via the electrolytic solution. Upon the charging and discharging, lithium is inserted and extracted in an ionic state.

Figure 5:
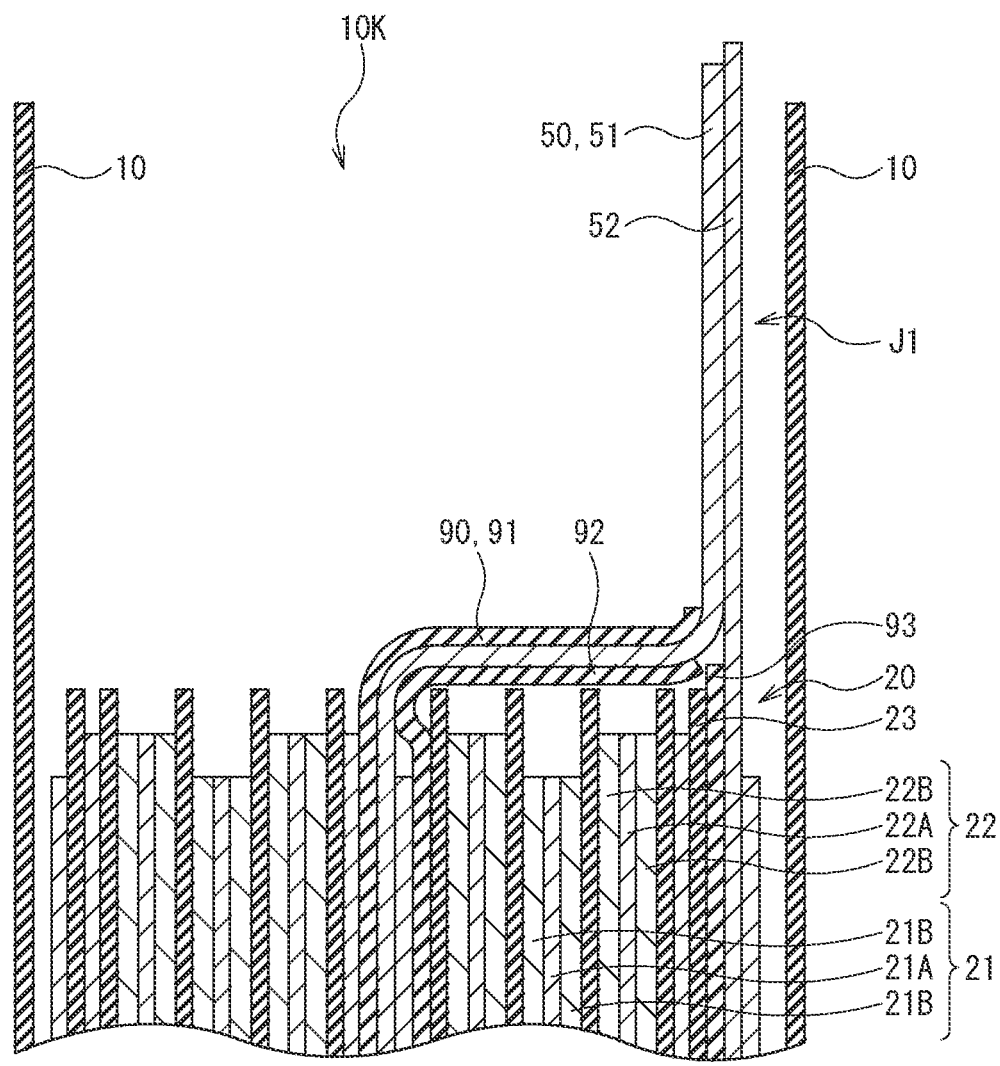
FIG. 5 is a sectional diagram for describing a manufacturing process of the secondary battery according to an embodiment of the present technology.
Figure 6:
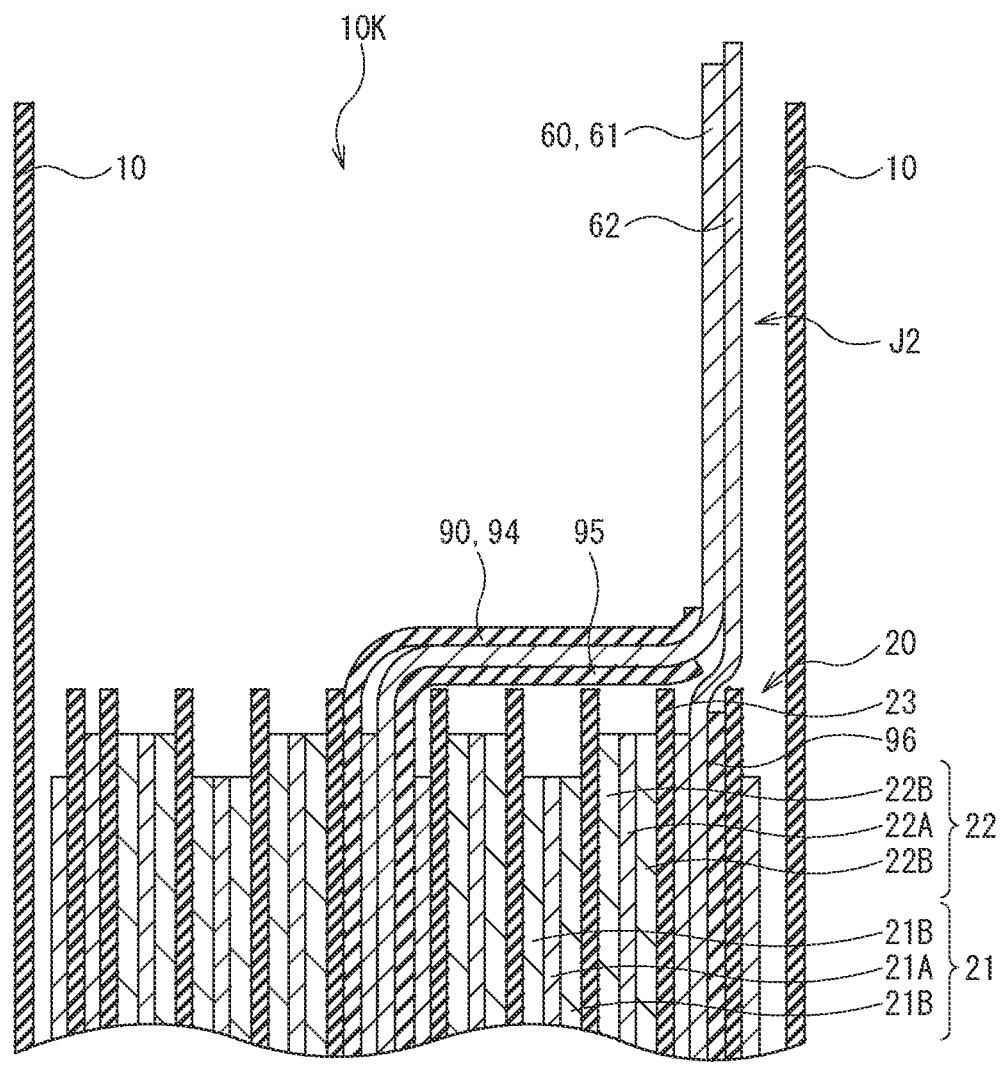
FIG. 6 is another sectional diagram for describing the manufacturing process of the secondary battery according to an embodiment of the present technology.

For describing the process of manufacturing the secondary battery, FIG. 5 illustrates a sectional configuration of the secondary battery in the course of manufacture, and corresponds to FIG. 3. FIG. 6 illustrates the sectional configuration of the secondary battery in the course of manufacture for describing the process of manufacturing the secondary battery, and corresponds to FIG. 4. In the following description, reference will be made as necessary to FIGS. 1 to 4 which have been already described.

In a case of manufacturing the secondary battery, the secondary battery is assembled as described below, with use of the outer package film 10 having the opening 10K illustrated in each of FIGS. 5 and 6. Each of FIGS. 5 and 6 illustrates the outer package film 10 before sealing, i.e., before formation of the seal part S. The opening 10K of the outer package film 10 before the sealing has an opening area greater than the opening area of each of the openings 10K1 and 10K2, to thereby allow the battery device 20 to be placed inside the outer package film 10.

First, the positive electrode active material is mixed with, on an as-needed basis, a material such as the positive electrode binder or the positive electrode conductor to thereby obtain a positive electrode mixture. Thereafter, the positive electrode mixture is put into a solvent such as an organic solvent to thereby prepare a paste positive electrode mixture slurry. Lastly, the positive electrode mixture slurry is applied on opposite sides of the positive electrode current collector 21A to thereby form the positive electrode active material layers 21B. Thereafter, the positive electrode active material layers 21B may be compression-molded by means of a machine such as a roll pressing machine. In this case, the positive electrode active material layers 21B may be heated. The positive electrode active material layers 21B may be compression-molded multiple times. The positive electrode active material layers 21B are thus formed on the respective opposite sides of the positive electrode current collector 21A. As a result, the positive electrode 21 is fabricated.

The negative electrode active material layers 22B are formed on respective opposite sides of the negative electrode current collector 22A by a procedure similar to the fabrication procedure of the positive electrode 21 described above. Specifically, the negative electrode active material is mixed with, on an as-needed basis, a material such as the negative electrode binder or the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the opposite sides of the negative electrode current collector 22A to thereby form the negative electrode active material layers 22B. Thereafter, the negative electrode active material layers 22B may be compression-molded. The negative electrode active material layers 22B are thus formed on the respective opposite sides of the negative electrode current collector 22A. As a result, the negative electrode 22 is fabricated.

The electrolyte salt is put into a solvent. The electrolyte salt is thereby dispersed or dissolved in the solvent. As a result, the electrolytic solution is prepared.

First, the positive electrode tabs 51 and 52 are coupled to the positive electrode 21 (the positive electrode current collector 21A) by a method such as a welding method, and the negative electrode tabs 61 and 62 are coupled to the negative electrode 22 (the negative electrode current collector 22A) by a method such as a welding method. Thereafter, the positive electrode 21 and the negative electrode 22 are alternately stacked on each other with the separator 23 interposed therebetween, following which the positive electrode 21, the negative electrode 22, and the separator 23 are wound to thereby fabricate the wound body 120. In this case, upon fabrication of the wound body 120 (upon winding), each of the insulating tapes 91 to 96 is inserted at an appropriate position in middle of the winding.

It should be understood that the welding method includes one or more of a laser welding method, a resistance welding method, and any other welding method. Details of the welding method described here apply also to the following.

Thereafter, the one end of the positive electrode tab 51 and the one end of the positive electrode tab 52 are joined to each other by a method such as a welding method, to thereby form the joint part J1. Further, the one end of the negative electrode tab 61 and the one end of the negative electrode tab 62 are joined to each other by a method such as a welding method, to thereby form the joint part J2.

Thereafter, the positive electrode lead 30 (the lead parts 30A and 30B) covered with the positive electrode sealant 70 having the tube shape is prepared, and the lead part 30B is coupled to the joint part J1 by a method such as a welding method, to thereby form the coupling part C1. Further, the negative electrode lead 40 (the lead parts 40A and 40B) covered with the negative electrode sealant 80 having the tube shape is prepared, and the lead part 40B is coupled to the joint part J2 by a method such as a welding method, to thereby form the coupling part C2. Thus, the positive electrode wiring line 200 (the positive electrode lead 30 and the positive electrode tabs 51 and 52) and the negative electrode wiring line 300 (the negative electrode lead 40 and the negative electrode tabs 61 and 62) are each coupled to the wound body 120.

Thereafter, the wound body 120 to which the positive electrode wiring line 200 and the negative electrode wiring line 300 are each coupled is placed inside the outer package film 10 through the opening 10K. The wound body 120 is thereby placed inside the outer package film 10 in a state where the positive electrode wiring line 200 and the negative electrode wiring line 300 are each already coupled to the wound body 120. This allows the positive electrode wiring line 200, the negative electrode wiring line 300, and the wound body 120 to be placed inside the outer package film 10 together.

In this case, the positive electrode tab 51 is bent to lie along the lower surface M1, the side surface M3, and the upper surface M2 of the lead part 30B in this order, and the negative electrode tab 61 is bent to lie along the lower surface N1, the side surface N3, and the upper surface N2 of the lead part 40B in this order. Further, the positive electrode wiring line 200 and the positive electrode sealant 70 are each led out to the outside of the outer package film 10 through the opening 10K, and the negative electrode wiring line 300 and the negative electrode sealant 80 are each led out to the outside of the outer package film 10 through the opening 10K. Further, inside the outer package film 10, the positive electrode sealant 70 is interposed between the coupling part C1 and the battery device 20, and the negative electrode sealant 80 is interposed between the coupling part C2 and the battery device 20.

Lastly, the electrolytic solution is injected into the outer package film 10 through the opening 10K, following which portions of the outer package film 10 mutually opposed at the opening 10K are joined to each other by a method such as a thermal fusion bonding method. Thus, the opening 10K1 is sealed by means of the positive electrode sealant 70 in a state where the positive electrode wiring line 200 is present at the opening 10K1. In addition, the opening 10K2 is sealed by means of the negative electrode sealant 80 in a state where the negative electrode wiring line 300 is present at the opening 10K2. Further, the wound body 120 including the positive electrode 21, the negative electrode 22, and the separator 23 is impregnated with the electrolytic solution. As a result, the battery device 20 which is the wound electrode body is fabricated.

Thus, the seal part S is formed while the positive electrode wiring line 200 and the negative electrode wiring line 300 are each led out from the outer package film 10 to the outside. Accordingly, the battery device 20 is sealed inside the outer package film 10. As a result, the secondary battery of the laminated-film type is completed.

According to this secondary battery, the battery device 20 is contained inside the outer package film 10 having flexibility. The positive electrode wiring line 200 (the positive electrode lead 30 and the positive electrode tabs 51 and 52) extending from the inside to the outside of the outer package film 10 is coupled to the battery device 20. Further, the positive electrode sealant 70 having an insulating property and sealing the opening 10K1 of the outer package film 10 extends along the positive electrode wiring line 200 and is interposed between the battery device 20 and the positive electrode wiring line 200. Accordingly, it is possible to suppress an internal short circuit of the secondary battery caused by an external load for the following reasons.

Figure 7:
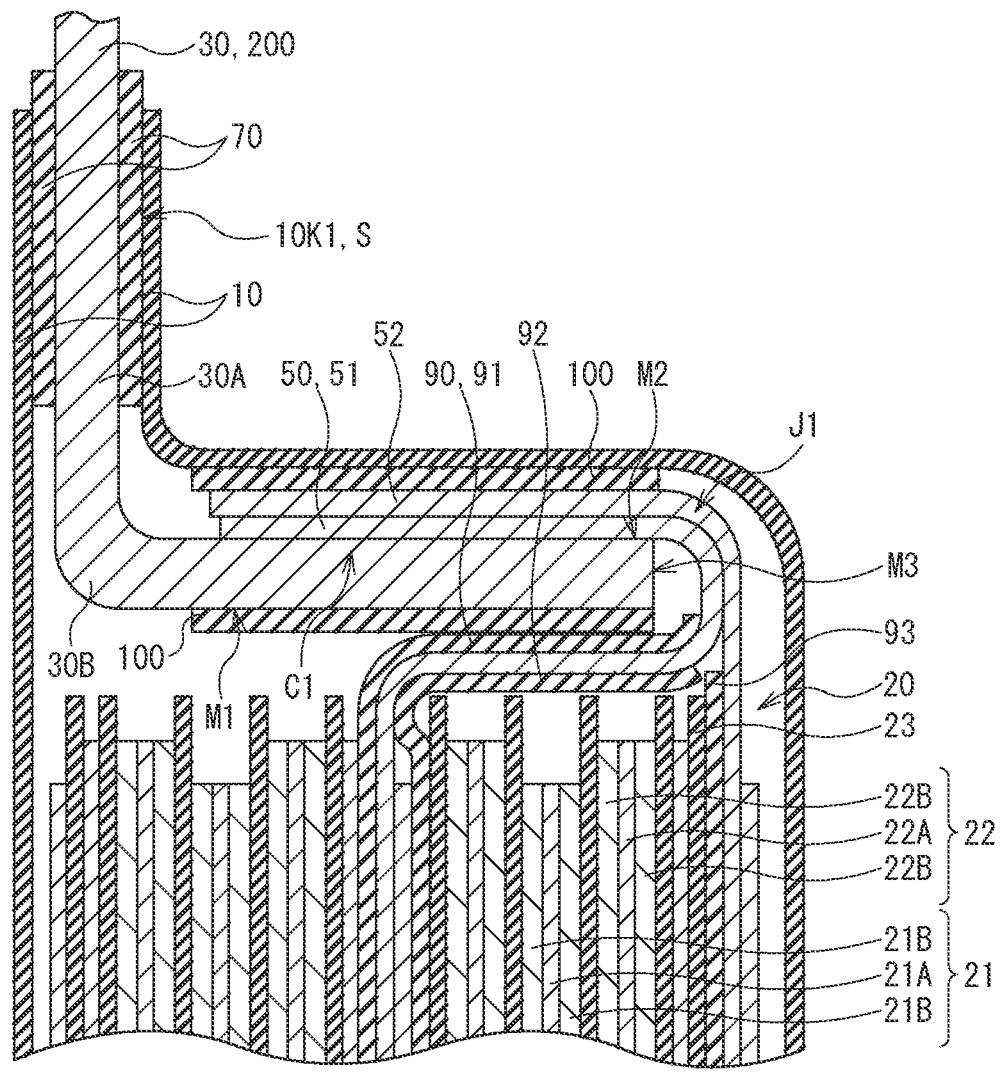
FIG. 7 is a sectional view of a configuration of a secondary battery of a comparative example.

FIG. 7 illustrates a sectional configuration of a secondary battery of a comparative example, and corresponds to FIG. 3. As illustrated in FIG. 7, the secondary battery of the comparative example has a configuration similar to the configuration of the secondary battery of the present embodiment illustrated in FIG. 3, except that the positive electrode sealant 70 is disposed only at the seal part S and an insulating tape 100 having a tube shape is additionally provided. The insulating tape 100 covers the periphery of the coupling part C1 at which the positive electrode lead 30 (the lead part 30B) and the joint part J1 are coupled to each other.

In each of the secondary battery of the present embodiment illustrated in FIG. 3 and the secondary battery of the comparative example illustrated in FIG. 7, the positive electrode wiring line 200 (the positive electrode lead 30 and the positive electrode tabs 51 and 52) is coupled to the battery device 20 (the positive electrode 21).

In the secondary battery of the comparative example, the insulating tape 100 is present between the coupling part C1 and the battery device 20. In this case, even if the insulating tapes 91 and 92 are damaged, the coupling part C1 is insulated from its surroundings by means of the insulating tape 100, and therefore, a short circuit between the coupling part C1 and the negative electrode 22 is prevented from occurring easily.

However, because the insulating tape 100 merely covers the periphery of the coupling part C1, the insulating tape 100 is fixed only by its own fixing ability or fixed only by being sandwiched by surrounding members. In this case, if the secondary battery receives an external load such as vibration or impact, the position of the insulating tape 100 is deviated easily from the original position by a cause such as a positional change of the members surrounding the insulating tape 100. In a case where the position of the insulating tape 100 is deviated, the coupling part C1 is exposed, which causes the coupling part C1 to be easily in contact with an electrically conductive component around the coupling part C1. This in turn causes a short circuit between the coupling part C1 and the negative electrode 22 to occur easily, and therefore causes stable charging and discharging operations to be inhibited easily due to an external load. Accordingly, it is difficult to suppress an internal short circuit of the secondary battery due to an external load.

In contrast, in the secondary battery of the present embodiment, the positive electrode sealant 70 having an insulating property is present between the coupling part C1 and the battery device 20. In this case, even if the insulating tapes 91 and 92 are damaged, the coupling part C1 is electrically insulated from its surrounding by means of the positive electrode sealant 70. This helps to prevent a short circuit between the coupling part C1 and the negative electrode 22 from occurring easily.

In addition, the positive electrode sealant 70 is fixed to the outer package film 10 to form the seal part S, i.e., to seal the opening 10K1. In this case, because the position of the positive electrode sealant 70 is prevented from deviating easily from the original position even if the secondary battery receives an external load, it is easier to maintain a state in which the positive electrode sealant 70 covers the periphery of the coupling part C1. This helps to prevent the coupling part C1 from being exposed easily regardless of presence or absence of the external load, and therefore to prevent the coupling part C1 from easily coming into contact with the electrically conductive component around the coupling part C1. This helps to prevent a short circuit between the coupling part C1 and the negative electrode 22 from occurring easily, and therefore secures stable charging and discharging operations without any influence from the external load. Accordingly, it is possible to suppress an internal short circuit of the secondary battery caused by the external load.

In this case, in particular, there is no need to additionally provide the insulating tape 100 because mere expanding of a range to provide the positive electrode sealant 70 to the vicinity of the coupling part C1 prevents a short circuit between the coupling part C1 and the negative electrode 22. Accordingly, it is possible to allow for a simple configuration of the secondary battery and to also allow for easy manufacture of the secondary battery.

Moreover, in the manufacturing process of the secondary battery, the wound body 120 is placed inside the outer package film 10 in the state where the positive electrode wiring line 200 and the negative electrode wiring line 300 are each already coupled to the wound body 120. This allows the positive electrode wiring line 200, the negative electrode wiring line 300, and the wound body 120 to be placed inside the outer package film 10 together. Accordingly, it is easy to contain the positive electrode wiring line 200, the negative electrode wiring line 300, and the wound body 120 inside the outer package film 10. As a result, it is also possible to manufacture the secondary battery easily and stably.

Other than the above, in the secondary battery of the present embodiment, the outer package film 10 and the positive electrode sealant 70 may each include a thermal-fusion-bondable material, and the outer package film 10 and the positive electrode sealant 70 may be thermal-fusion-bonded to each other at the opening 10K1. This allows the opening 10K1 to be easily sealed by means of the positive electrode sealant 70, and allows the positive electrode sealant 70 to be fixed easily at the seal part S. Accordingly, it is possible to achieve higher effects.

Moreover, the positive electrode sealant 70 may be interposed further between the outer package film 10 and the coupling part C1. This allows the coupling part C1 to be insulated from its surroundings by means of the positive electrode sealant 70, and therefore helps to prevent a short circuit caused by the coupling part C1 from occurring easily. Accordingly, it is possible to achieve higher effects. In this case, the outer package film 10 and the positive electrode sealant 70 may each include a thermal-fusion-bondable material, and the outer package film 10 and the positive electrode sealant 70 may be thermal-fusion-bonded to each other. This allows the positive electrode sealant 70 to be fixed to the outer package film 10, and thereby prevents the positional deviation of the positive electrode sealant 70. Accordingly, it is possible to achieve further higher effects.

Moreover, the positive electrode sealant 70 may cover the periphery of the positive electrode lead 30. This helps to sufficiently prevent a short circuit caused by the coupling part C1 from occurring easily. Accordingly, it is possible to achieve higher effects.

Moreover, the positive electrode wiring line 200 may include the positive electrode lead 30 and the positive electrode tabs 50 (the positive electrode tabs 51 and 52). This allows the positive electrode wiring line 200 to be coupled to the battery device 20 (the positive electrode 21) by means of the positive electrode tabs 50. This allows for a decrease in electric resistance (electric coupling resistance) of the secondary battery (the battery device 20) as compared with a case where the positive electrode wiring line 200 is a single wiring line as a whole and the single piece of positive electrode wiring line 200 is therefore coupled to the battery device 20. Accordingly, it is possible to achieve higher effects. In addition, the decrease in electric coupling resistance is achievable by only increasing the number of the positive electrode tabs 50 without increasing the number of the positive electrode leads 30. This makes it possible to decrease the electric coupling resistance without increasing the volume loss caused by the positive electrode lead 30.

In this case, the number of the positive electrode tabs 50 may be two, i.e., the positive electrode tabs 51 and 52 may be provided. This decreases the electric resistance of the battery device 20 while securing the energy density per unit volume and allowing the seal part S to be stably sealed. Accordingly, it is possible to achieve higher effects.

Moreover, the positive electrode lead 30 may include the lead part 30B (the lower surface M1, the upper surface M2, and the side surface M3) opposed to the battery device 20. The positive electrode tab 51 of the positive electrode tabs 51 and 52 may be bent to lie along the lower surface M1, the side surface M3, and the upper surface M2 in this order. The joint part J1 may be coupled to the lead part 30B at the upper surface M2. This reduces the volume loss inside the outer package film 10, as compared to a case where the positive electrode tab 51 is not bent to lie along the lower surface M1, the side surface M3, and the upper surface M2 in this order and where the joint part J1 is not coupled to the lead part 30B at the upper surface M2. Therefore, the energy density per unit volume increases. Accordingly, it is possible to achieve higher effects.

Moreover, the secondary battery may include a lithium-ion secondary battery. This makes it possible to stably obtain a sufficient battery capacity by utilizing insertion and extraction of lithium. Accordingly, it is possible to achieve higher effects.

Here, the description has been given of the action and effects based on the configuration of each of the positive electrode wiring line 200 (the positive electrode lead 30 and the positive electrode tabs 50 (the positive electrode tabs 51 and 52)) and the positive electrode sealant 70. However, although not specifically illustrated, the negative electrode wiring line 300 (the negative electrode lead 40 and the negative electrode tabs 60 (the negative electrode tabs 61 and 62)) and the negative electrode sealant 80 have configurations similar to those of the positive electrode wiring line 200 and the positive electrode sealant 70, respectively. Accordingly, it is possible to achieve similar action and effects also on the basis of the respective configurations of the negative electrode wiring line 300 and the negative electrode sealant 80.

Next, modifications of the foregoing secondary battery will be described. The configuration of the secondary battery is appropriately modifiable, as will be described below. It should be understood that any two or more of the following series of modifications may be combined.

[Modification 1]

In FIG. 3, both the positive electrode sealant 70 and the negative electrode sealant 80 are introduced to the inside of the outer package film 10, i.e., the vicinity of the battery device 20.

However, only one of the positive electrode sealant 70 and the negative electrode sealant 80 may be introduced to the inside of the outer package film 10. That is, only the positive electrode sealant 70 may be introduced to the inside of the outer package film 10 with the negative electrode sealant 80 not being introduced to the inside of the outer package film 10. Alternatively, only the negative electrode sealant 80 may be introduced to the inside of the outer package film 10 with the positive electrode sealant 70 not being introduced to the inside of the outer package film 10.

The other of the positive electrode sealant 70 and the negative electrode sealant 80 that is not introduced to the inside of the outer package film 10 may be present only at the seal part S, as described in relation to the secondary battery of the comparative example illustrated in FIG. 7.

Even in such a case, a short circuit caused by the coupling part C1 is prevented by means of the positive electrode sealant 70 or the negative electrode sealant 80, as compared to a case where neither the positive electrode sealant 70 nor the negative electrode sealant 80 is introduced to the inside of the outer package film 10. Accordingly, it is possible to achieve similar effects.

However, in order to sufficiently prevent a short circuit caused by the coupling part C1, both the positive electrode sealant 70 and the negative electrode sealant 80 are preferably introduced to the inside of the outer package film 10.
[Modification 2]

In FIG. 3, the number of the positive electrode tabs 50 is two, i.e., the positive electrode tabs 51 and 52 are provided; in FIG. 4, the number of the negative electrode tabs 60 is two, i.e., the negative electrode tabs 61 and 62 are provided. However, the number of the positive electrode tabs 50 is not particularly limited as long as it is two or more, and may therefore be three or more. In addition, the number of the negative electrode tabs 60 is not particularly limited as long as it is two or more, and may therefore be three or more. In such cases also, it is possible to achieve similar effects.

In such a case, in particular, the greater the respective numbers of the positive electrode tabs 50 and the negative electrode tabs 60 are, the more the electric resistance of the secondary battery (the battery device 20) decreases. Accordingly, it is possible to achieve further higher effects. However, as described above, if the respective numbers of the positive electrode tabs 50 and the negative electrode tabs 60 are excessively increased, the energy density per unit volume can decrease due to an increase in volume loss, and stable sealing of the seal part S can become difficult due to the complicated sealing structure.
[Modification 3]

In FIG. 3, the positive electrode sealant 70 is led out to the outside of the outer package film 10. However, although not specifically illustrated here, the positive electrode sealant 70 may extend from the inside of the outer package film 10 to the seal part S rather than being led out to the outside of the outer package film 10. In such a case also, the opening 10K1 is sealed by means of the positive electrode sealant 70. Accordingly, it is possible to achieve similar effects.

Modification 3 described above is also applicable to the negative electrode sealant 80 illustrated in FIG. 4. That is, the negative electrode sealant 80 may extend from the inside of the outer package film 10 to the seal part S rather than being led out to the outside of the outer package film 10. In such a case also, it is possible to achieve similar effects.
[Modification 4]

Figure 8:
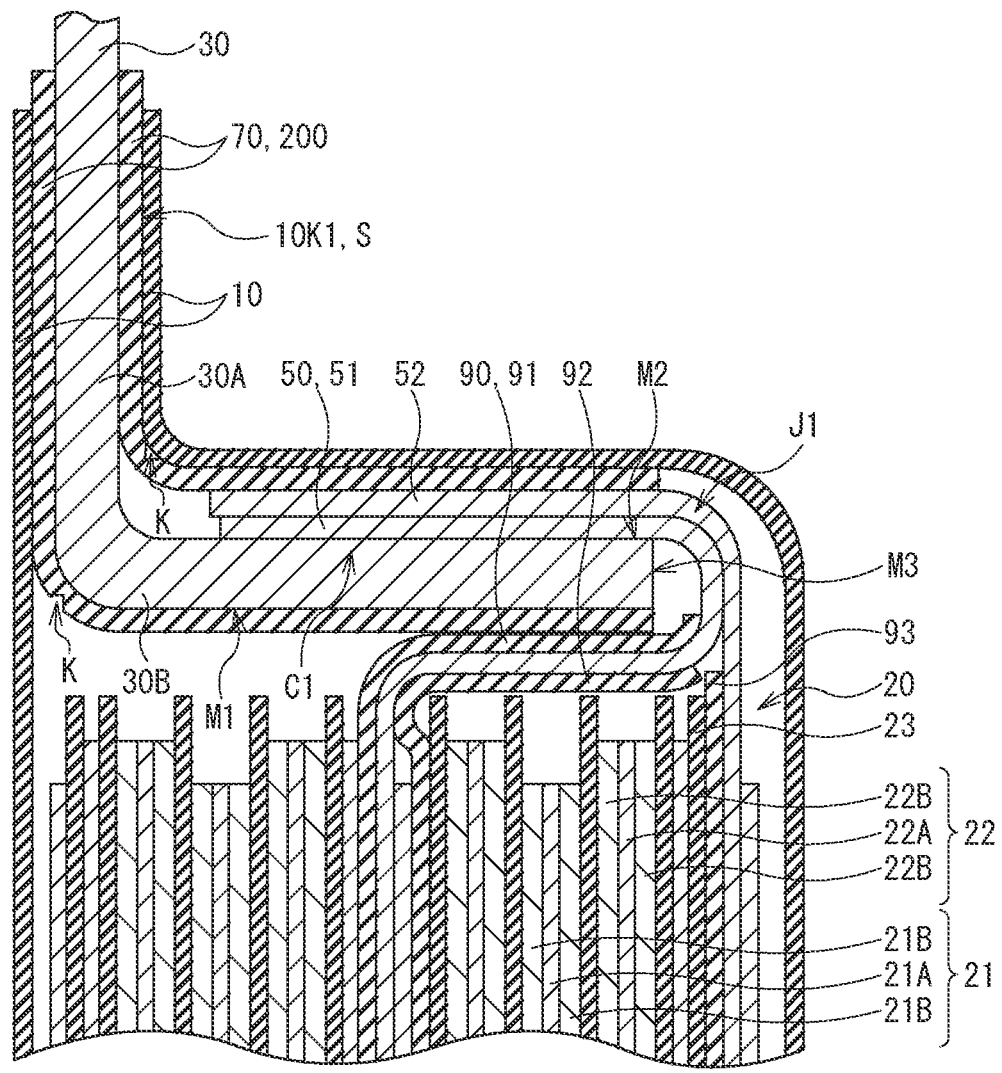
FIG. 8 is a sectional view of a configuration of a secondary battery according to an embodiment of the present technology.

As illustrated in FIG. 8 corresponding to FIG. 3, the positive electrode sealant 70 may have a cut K at a position opposed to a bending position of the positive electrode lead 30, i.e., a position at which the lead parts 30A and 30B are coupled to each other. In a case where the positive electrode sealant 70 has a tube shape, the cut K may be provided along the entire outer periphery (the entire circumferential portion) of the positive electrode sealant 70, or may be provided along a portion of the outer periphery of the positive electrode sealant 70. The cut K is provided on a surface of the positive electrode sealant 70 on a side farther from the positive electrode lead 30. However, the cut K may be provided only along a portion of the outer periphery of the positive electrode sealant 70, or may be provided on a surface of the positive electrode sealant 70 on a side closer to the positive electrode lead 30. It should be understood that the number of the cuts K is not particularly limited, and may therefore be freely chosen.

In such a case also, a short circuit caused by the coupling part C1 is prevented by means of the positive electrode sealant 70. Accordingly, it is possible to achieve similar effects. In this case, in particular, the cut K allows the positive electrode sealant 70 to be bent easily, and therefore, it is possible to prevent a short circuit from occurring due to a damage of the positive electrode sealant 70, as compared with a case where the positive electrode sealant 70 has no cut K.

To be more specific, in the case where the positive electrode sealant 70 has no cut K, the positive electrode sealant 70 is forcefully bent at the bending position, and can be, for example, broken at the bending position in some cases. In contrast, in the case where the positive electrode sealant 70 has the cut K, the positive electrode sealant 70 is smoothly bent by means of the cut K at the bending position, and is therefore prevented from being broken easily at the bending position.

Accordingly, it is possible to prevent a short circuit caused by the coupling part C1 by means of the positive electrode sealant 70 while reducing the possibility that the positive electrode sealant 70 is broken.

Modification 4 described above is also applicable to the negative electrode sealant 80 illustrated in FIG. 4. That is, the negative electrode sealant 80 may have a cut K at a position corresponding to the bending position. In such a case also, it is possible to achieve similar effects.

It goes without saying that only one of the positive electrode sealant 70 and the negative electrode sealant 80 may have the cut K, or both the positive electrode sealant 70 and the negative electrode sealant 80 may have the respective cuts K.
[Modification 5]

In FIG. 3, the positive electrode wiring line 200 includes the positive electrode lead 30 and the positive electrode tabs 50, and the positive electrode lead 30 and each of the positive electrode tabs 50 are coupled to each other. In other words, the positive electrode wiring line 200 includes two kinds of members that are physically separated from each other (i.e., the positive electrode lead 30 and the positive electrode tabs 50).

However, the positive electrode wiring line 200 may include one kind (one piece) of member in which the positive electrode lead 30 and the positive electrode tabs 50 are integrated together. That is, the positive electrode wiring line 200 may include a member having one end which includes only one part, and another end which is branched into two or more parts. In such a case also, a short circuit caused by the positive electrode wiring line 200 is prevented by means of the positive electrode sealant 70. Accordingly, it is possible to achieve similar effects.

Modification 5 described above is applicable also to the negative electrode wiring line 300 illustrated in FIG. 4. That is, the negative electrode wiring line 300 may include one piece of member in which the negative electrode lead 40 and the negative electrode tabs 60 are integrated together. In such a case also, it is possible to achieve similar effects.
[Modification 6]

In FIG. 3, the other end of the positive electrode tab 51 and the other end of the positive electrode tab 52 are joined to each other by a method such as a welding method to thereby form the joint part J1. However, because it suffices that the positive electrode tabs 51 and 52 are in contact with each other, the positive electrode tabs 51 and 52 may be merely stacked on each other rather than being joined to each other by a method such as a welding method. In such a case also, the positive electrode tabs 51 and 52 are coupled to the lead part 30B. Accordingly, it is possible to achieve similar effects.

Modification 6 described above is applicable also to the negative electrode tabs 61 and 62 illustrated in FIG. 4. That is, the negative electrode tabs 61 and 62 may be merely stacked on each other rather than forming the joint part J2. In such a case also, the negative electrode tabs 61 and 62 are coupled to the lead part 40B. Accordingly, it is possible to achieve similar effects.

[Modification 7]

The separator 23 which is a porous film is used. However, although not specifically illustrated here, a separator of a stacked type including a polymer compound layer may be used instead of the separator 23 which is the porous film.

Specifically, the separator of the stacked type includes a base layer which is the above-described porous film, and a polymer compound layer provided on one side or each of opposite sides of the base layer. A reason for this is that adherence of the separator to each of the positive electrode 21 and the negative electrode 22 improves to suppress the occurrence of positional deviation of the battery device 20. This helps to prevent the secondary battery from easily swelling even if, for example, a decomposition reaction of the electrolytic solution occurs. The polymer compound layer includes a polymer compound such as polyvinylidene difluoride. A reason for this is that such a polymer compound has superior physical strength and is electrochemically stable.

It should be understood that the base layer, the polymer compound layer, or both may include one or more kinds of particles including, for example, inorganic particles and resin particles. A reason for this is that such particles dissipate heat upon heat generation by the secondary battery, and this improves heat resistance and safety of the secondary battery. The inorganic particles are not particularly limited in kind, and examples thereof include particles of the following materials: aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, the polymer compound and an organic solvent is prepared, following which the precursor solution is applied on one side or each of opposite sides of the base layer.

In the case where the separator of the stacked type is used also, lithium is movable between the positive electrode 21 and the negative electrode 22. Accordingly, it is possible to achieve similar effects.

[Modification 8]

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared, following which the precursor solution is applied on one side or opposite sides of each of the positive electrode 11 and the negative electrode 12.

In the case where the electrolyte layer is used also, lithium is movable between the positive electrode 21 and the negative electrode 22 via the electrolyte layer. Accordingly, it is possible to achieve similar effects.

[Modification 9]

In FIG. 3, the lead part 30A extends in the direction intersecting with the extending direction of the lead part 30B, and the positive electrode lead 30 is therefore bent. However, although not specifically illustrated here, the lead part 30A may extend in a direction similar to the extending direction of the lead part 30B. The positive electrode lead 30 may therefore extend in one direction (the horizontal direction in FIG. 3) rather than being bent, and the lead part 30A may therefore be led out from the outer package film 10 to the outside via the opening 10K1 provided in the extending direction of the positive electrode lead 30. In such a case also, the positive electrode tabs 51 and 52 are coupled to the lead part 30B. Accordingly, it is possible to achieve similar effects.

However, in order to allow for easy coupling of the secondary battery to electronic equipment, the lead part 30A preferably extends in the direction intersecting with the extending direction of the lead part 30B.

Modification 9 described above is applicable also to the negative electrode lead 40 (the lead parts 40A and 40B) illustrated in FIG. 4. That is, the lead part 40A may extend in a direction similar to the extending direction of the lead part 40B, and the negative electrode lead 40 therefore needs not to be bent. In such a case also, the negative electrode tabs 61 and 62 are coupled to the lead part 40B. Accordingly, it is possible to achieve similar effects.

[Modification 10]

In FIG. 3, the positive electrode tabs 50 and the positive electrode current collector 21A are respective members separated from each other. However, the positive electrode tabs 50 and the positive electrode current collector 21A may be integrated with each other. In this case, in a process of forming the positive electrode current collector 21A by means of a punching process on a metal foil, the metal foil may be punched into a configuration in which the positive electrode tabs 50 and the positive electrode current collector 21A are integrated with each other. It is thereby possible to form the positive electrode current collector 21A integrated with the positive electrode tabs 50. In such a case also, the positive electrode tabs 50 are coupled to the lead part 30B. Accordingly, it is possible to achieve similar effects.

Modification 10 described above is applicable also to the negative electrode tabs 60 and the negative electrode current collector 22A illustrated in FIG. 4. That is, the negative electrode tabs 60 and the negative electrode current collector 22A may be integrated with each other. In such a case also, the negative electrode tabs 60 are coupled to the lead part 40B. Accordingly, it is possible to achieve similar effects.

Next, a description is given of applications (application examples) of the above-described secondary battery.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. It should be understood that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable. The secondary battery to be used in the following application examples is not limited to a particular kind, and may therefore be of a laminated-film type or a cylindrical type.

Figure 9:
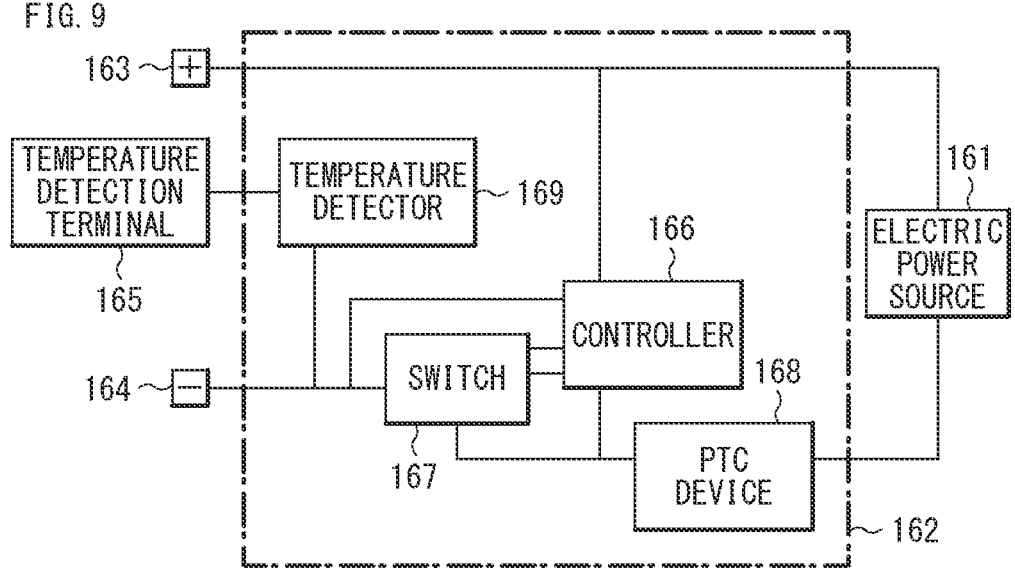
FIG. 9 is a block diagram illustrating a configuration of an application example of the secondary battery according to an embodiment, which is a battery pack including a single battery.

FIG. 9 illustrates a block configuration of a battery pack including a single battery. The battery pack described here is a simple battery pack (a so-called soft pack) including one secondary battery, and is to be mounted on, for example, electronic equipment typified by a smartphone.

As illustrated in FIG. 9, the battery pack includes an electric power source 161 and a circuit board 162. The circuit board 162 is coupled to the electric power source 161, and includes a positive electrode terminal 163, a negative electrode terminal 164, and a temperature detection terminal (a so-called T terminal) 165.

The electric power source 161 includes one secondary battery. The secondary battery has a positive electrode lead coupled to the positive electrode terminal 163 and a negative electrode lead coupled to the negative electrode terminal 164. The electric power source 161 is couplable to outside via the positive electrode terminal 163 and the negative electrode terminal 164, and is thus chargeable and dischargeable via the positive electrode terminal 163 and the negative electrode terminal 164. The circuit board 162 includes a controller 166, a switch 167, a PTC device 168, and a temperature detector 169. However, the PTC device 168 may be omitted.

The controller 166 includes, for example, a central processing unit (CPU) and a memory, and controls an overall operation of the battery pack. The controller 166 detects and controls a use state of the electric power source 161 on an as-needed basis.

If a battery voltage of the electric power source 161 (the secondary battery) reaches an overcharge detection voltage or an overdischarge detection voltage, the controller 166 turns off the switch 167. This prevents a charging current from flowing into a current path of the electric power source 161. In addition, if a large current flows upon charging or discharging, the controller 166 turns off the switch 167 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 167 includes, for example, a charge control switch, a discharge control switch, a charging diode, and a discharging diode. The switch 167 performs switching between coupling and decoupling between the electric power source 161 and external equipment in accordance with an instruction from the controller 166. The switch 167 includes, for example, a metal-oxide-semiconductor field-effect transistor (MOSFET) including a metal-oxide semiconductor. The charging and discharging currents are detected on the basis of an ON-resistance of the switch 167.

The temperature detector 169 includes a temperature detection device such as a thermistor. The temperature detector 169 measures a temperature of the electric power source 161 using the temperature detection terminal 165, and outputs a result of the temperature measurement to the controller 166. The result of the temperature measurement to be obtained by the temperature detector 169 is used, for example, in a case where the controller 166 performs charge/discharge control upon abnormal heat generation or in a case where the controller 166 performs a correction process upon calculating a remaining capacity.

Figure 10:
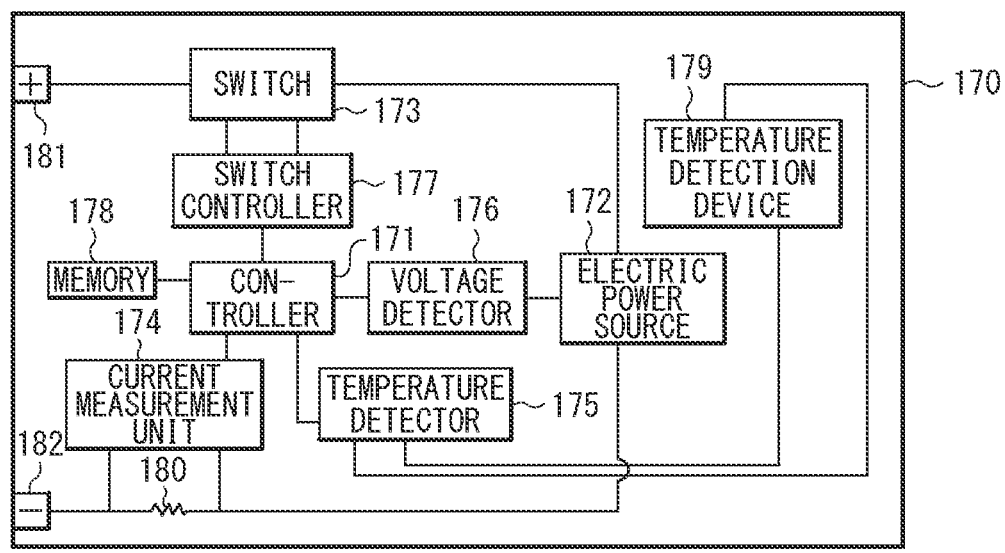
FIG. 10 is a block diagram illustrating a configuration of an application example of the secondary battery according to an embodiment, which is a battery pack including an assembled battery.

FIG. 10 illustrates a block configuration of a battery pack including an assembled battery. In the following description, reference will be made as necessary to the components of the battery pack including the single battery (see FIG. 9).

As illustrated in FIG. 10, the battery pack includes a positive electrode terminal 181 and a negative electrode terminal 182. Specifically, the battery pack includes, inside a housing 170, the following components: a controller 171, an electric power source 172, a switch 173, a current measurement unit 174, a temperature detector 175, a voltage detector 176, a switch controller 177, a memory 178, a temperature detection device 179, and a current detection resistor 180.

The electric power source 172 includes an assembled battery in which two or more secondary batteries are coupled to each other, and a type of the coupling of the two or more secondary batteries is not particularly limited. Accordingly, the coupling scheme may be in series, in parallel, or of a mixed type of both. For example, the electric power source 172 includes six secondary batteries coupled to each other in two parallel and three series.

Configurations of the controller 171, the switch 173, the temperature detector 175, and the temperature detection device 179 are similar to those of the controller 166, the switch 167, and the temperature detector 169 (the temperature detection device). The current measurement unit 174 measures a current using the current detection resistor 180, and outputs a result of the measurement of the current to the controller 171. The voltage detector 176 measures a battery voltage of the electric power source 172 (the secondary battery) and provides the controller 171 with a result of the measurement of the voltage that has been subjected to analog-to-digital conversion.

The switch controller 177 controls an operation of the switch 173 in response to signals supplied by the current measurement unit 174 and the voltage detector 176. If a battery voltage reaches an overcharge detection voltage or an overdischarge detection voltage, the switch controller 177 turns off the switch 173 (the charge control switch). This prevents a charging current from flowing into a current path of the electric power source 172. This enables the electric power source 172 to perform only discharging via the discharging diode, or only charging via the charging diode. In addition, if a large current flows upon charging or discharging, the switch controller 177 blocks the charging current or the discharging current.

The switch controller 177 may be omitted and the controller 171 may thus also serve as the switch controller 177. The overcharge detection voltage and the overdischarge detection voltage are not particularly limited, and are similar to those described above in relation to the battery pack including the single battery.

The memory 178 includes, for example, an electrically erasable programmable read-only memory (EEPROM) which is a non-volatile memory, and the memory 178 stores, for example, a numeric value calculated by the controller 171 and data (e.g., an initial internal resistance, a full charge capacity, and a remaining capacity) of the secondary battery measured in the manufacturing process.

The positive electrode terminal 181 and the negative electrode terminal 182 are terminals coupled to, for example, external equipment that operates using the battery pack, such as a laptop personal computer, or external equipment that is used to charge the battery pack, such as a charger. The electric power source 172 (the secondary battery) is chargeable and dischargeable via the positive electrode terminal 181 and the negative electrode terminal 182.

Figure 11:
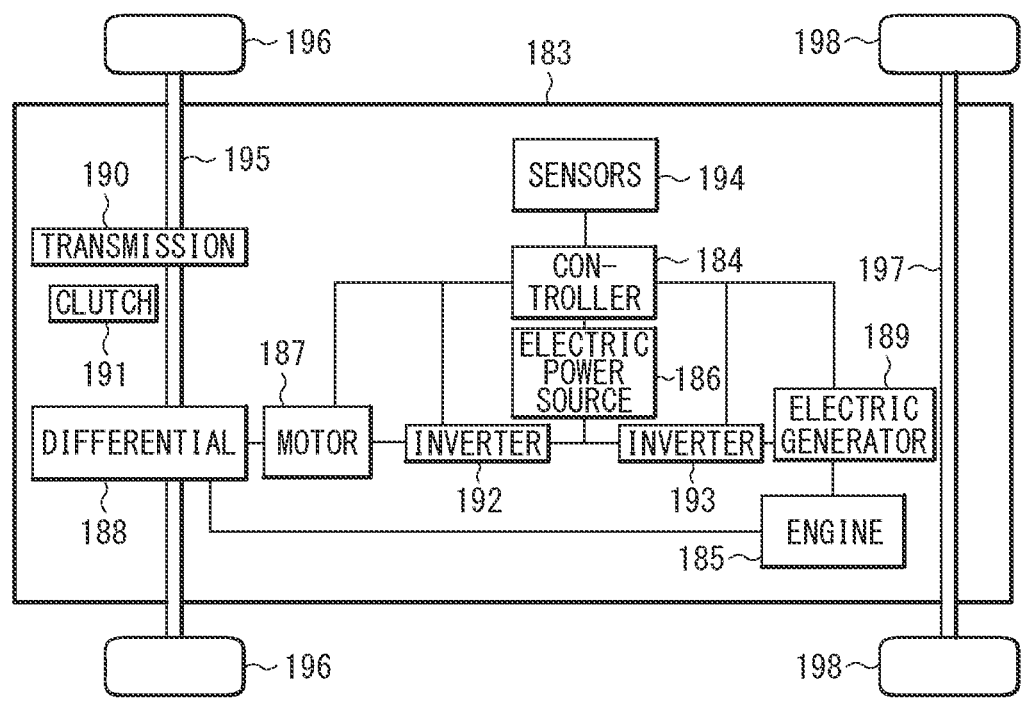
FIG. 11 is a block diagram illustrating a configuration of an application example of the secondary battery according to an embodiment, which is an electric vehicle.

FIG. 11 illustrates a block configuration of a hybrid automobile which is an example of the electric vehicle. As illustrated in FIG. 11, the electric vehicle includes, inside a housing 183, the following components: a controller 184, an engine 185, an electric power source 186, a motor 187, a differential 188, an electric generator 189, a transmission 190, a clutch 191, inverters 192 and 193, and sensors 194. The electric vehicle also includes a front wheel drive shaft 195, a pair of front wheels 196, a rear wheel drive shaft 197, and a pair of rear wheels 198. The front wheel drive shaft 195 and the pair of front wheels 196 are coupled to the differential 188 and the transmission 190.

The electric vehicle is configured to travel by using one of the engine 185 and the motor 187 as a driving source. The engine 185 is a major power source, such as a gasoline engine. In a case where the engine 185 is used as a power source, a driving force (a rotational force) of the engine 185 is transmitted to the front wheels 196 and the rear wheels 198 via the differential 188, the transmission 190, and the clutch 191, which are driving parts. It should be understood that the rotational force of the engine 185 is transmitted to the electric generator 189, and the electric generator 189 thus generates alternating-current power by utilizing the rotational force. In addition, the alternating-current power is converted into direct-current power via the inverter 193, and the direct-current power is thus accumulated in the electric power source 186. In contrast, in a case where the motor 187 which is a converter is used as a power source, electric power (direct-current power) supplied from the electric power source 186 is converted into alternating-current power via the inverter 192. Thus, the motor 187 is driven by utilizing the alternating-current power. A driving force (a rotational force) converted from the electric power by the motor 187 is transmitted to the front wheels 196 and the rear wheels 198 via the differential 188, the transmission 190, and the clutch 191, which are the driving parts.

When the electric vehicle is decelerated by means of a brake mechanism, a resistance force at the time of the deceleration is transmitted as a rotational force to the motor 187. Thus, the motor 187 may generate alternating-current power by utilizing the rotational force. The alternating-current power is converted into direct-current power via the inverter 192, and direct-current regenerative power is thus accumulated in the electric power source 186.

The controller 184 includes, for example, a CPU, and controls an overall operation of the electric vehicle. The electric power source 186 includes one or more secondary batteries and is coupled to an external electric power source. In this case, the electric power source 186 may be supplied with electric power from the external electric power source and thereby accumulate the electric power. The sensors 194 are used to control the number of revolutions of the engine 185 and to control an angle of a throttle valve (a throttle angle). The sensors 194 include one or more of sensors including, without limitation, a speed sensor, an acceleration sensor, and an engine speed sensor.

The case where the electric vehicle is a hybrid automobile has been described as an example; however, the electric vehicle may be a vehicle that operates using only the electric power source 186 and the motor 187 and not using the engine 185, such as an electric automobile.

Although not specifically illustrated here, other application examples are also conceivable as application examples of the secondary battery.

Specifically, the secondary battery is applicable to an electric power storage system. The electric power storage system includes, inside a building such as a residential house or a commercial building, the following components: a controller, an electric power source including one or more secondary batteries, a smart meter, and a power hub.

The electric power source is coupled to electric equipment such as a refrigerator installed inside the building, and is couplable to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached, the following components: a controller, and an electric power source including one or more secondary batteries.

Although the technology has been described above with reference to some embodiments and examples, the configuration of the technology is not limited to those described with reference to the embodiments and examples above, and is therefore modifiable in a variety of ways.

Specifically, although the description above relates to a case where the battery device has a wound-type device structure (the wound electrode body), the device structure of the battery device is not particularly limited, and therefore may be any other device structure such as a stacked-type device structure in which the electrodes (the positive electrode and the negative electrode) are stacked (a stacked electrode body), or a zigzag-folded-type device structure in which the electrodes (the positive electrode and the negative electrode) are folded in a zigzag manner.

Further, although the description above relates to a case where the electrode reactant is lithium, the electrode reactant is not particularly limited. Specifically, as described above, the electrode reactant may be another alkali metal such as sodium or potassium, or may be an alkaline earth metal such as beryllium, magnesium, or calcium. Other than the above, the electrode reactant may be another light metal such as aluminum.

The effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer package member having flexibility and having an opening;
a battery device accommodated inside the outer package member;
a wiring member extending from an inside of the outer package member to an outside of the outer package member via the opening, wherein the wiring member is coupled to the battery device; and
a sealing member having an insulating property, wherein the sealing member extends along the wiring member from the inside of the outer package member at least to the opening, and is interposed between the battery device and the wiring member, and the sealing member is configured to seal the opening.

2. The secondary battery according to claim 1, wherein the outer package member and the sealing member each include a thermal-fusion-bondable material, and
the outer package member and the sealing member are thermal-fusion-bonded to each other at the opening.

3. The secondary battery according to claim 1, wherein the sealing member is interposed further between the outer package member and the wiring member.

4. The secondary battery according to claim 2, wherein the sealing member is interposed further between the outer package member and the wiring member.

5. The secondary battery according to claim 3, wherein
the outer package member and the sealing member each include a thermal-fusion-bondable material, and
the outer package member and the sealing member are thermal-fusion-bonded to each other.

6. The secondary battery according to claim 4, wherein
the outer package member and the sealing member each include a thermal-fusion-bondable material, and
the outer package member and the sealing member are thermal-fusion-bonded to each other.

7. The secondary battery according to claim 1, wherein the wiring member includes
first wiring members disposed inside the outer package member, each of the first wiring members having a first end coupled to the battery device, and
a second wiring member extending from the inside of the outer package member to the outside of the outer package member via the opening, the second wiring member having a first end coupled to a second end of each of the first wiring members inside the outer package member and having a second end led out to the outside of the outer package member.

8. The secondary battery according to claim 7, wherein the first wiring members are two in number.

9. The secondary battery according to claim 7, wherein the sealing member is configured to cover a periphery of the second wiring member.

10. The secondary battery according to claim 8, wherein the sealing member is configured to cover a periphery of the second wiring member.

11. The secondary battery according to claim 7, wherein
the second wiring member includes an opposed part opposing to the battery device,
the opposed part includes
an opposed surface opposing to the battery device,
an opposite surface provided on an opposite side to the opposed surface, and
a side surface coupled to the opposed surface and the opposite surface,
a portion of the first wiring members is bent to lie along the opposed surface, the side surface, and the opposite surface in this order, and
the second end of each of the first wiring members is coupled to the opposed part at the opposite surface.

12. The secondary battery according to claim 8, wherein
the second wiring member includes an opposed part opposing to the battery device,
the opposed part includes
an opposed surface opposing to the battery device,
an opposite surface provided on an opposite side to the opposed surface, and
a side surface coupled to the opposed surface and the opposite surface,
a portion of the first wiring members is bent to lie along the opposed surface, the side surface, and the opposite surface in this order, and
the second end of each of the first wiring members is coupled to the opposed part at the opposite surface.

13. The secondary battery according to claim 9, wherein
the second wiring member includes an opposed part opposing to the battery device, the opposed part includes
- an opposed surface opposing to the battery device,
- an opposite surface provided on an opposite side to the opposed surface, and
- a side surface coupled to the opposed surface and the opposite surface, a portion of the first wiring members is bent to lie along the opposed surface, the side surface, and the opposite surface in this order, and the second end of each of the first wiring members is coupled to the opposed part at the opposite surface.

14. The secondary battery according to claim 11, wherein the second wiring member further includes an extending part coupled to the opposed part and extending to the outside of the outer package member via the opening, and the sealing member has a cut at a first position opposed to a second position at which the opposed part and the extending part are coupled to each other.

15. The secondary battery according to claim 1, wherein the secondary battery includes a lithium-ion secondary battery.

* * * * *